United States Patent [19]

Lamar

[11] Patent Number: 4,833,493
[45] Date of Patent: May 23, 1989

[54] SHEET FILM HOLDER

[76] Inventor: Jon Lamar, 236 E. 88th St., Apt. 1W, New York, N.Y. 10128

[21] Appl. No.: 23,759

[22] Filed: Mar. 9, 1987

[51] Int. Cl.$^4$ .......................... G03B 17/24; G03B 17/26
[52] U.S. Cl. ...................................... 354/107; 354/285
[58] Field of Search ............... 354/105, 106, 107, 108, 354/109, 283, 284, 285

[56] References Cited

U.S. PATENT DOCUMENTS

| | | |
|---|---|---|
| 1,323,364 | 12/1919 | Hood . |
| 1,330,235 | 2/1920 | Boxell . |
| 1,376,032 | 4/1921 | Ozols ................................... 354/108 |
| 2,188,843 | 1/1940 | Pappajion . |
| 2,315,987 | 4/1943 | Smith . |
| 2,377,226 | 5/1945 | Greer . |
| 3,631,243 | 12/1971 | Byler . |
| 3,916,423 | 10/1975 | Ueda et al. . |
| 4,268,144 | 5/1981 | Wheeler . |
| 4,634,249 | 1/1987 | Tomidokoro ....................... 354/108 |

Primary Examiner—A. A. Mathews
Attorney, Agent, or Firm—Wolder, Gross & Yavner

[57] ABSTRACT

A sheet film holder with means to expose a portion of the unused film edge to a logo, copyright notice or other desired media. The top and bottom rear portions of a dual sheet holder are hingedly connected to the rear wall. The central portion of the bottom arm and the connecting member of the side channel are made of light conducting material. An opaque acetate with clear media is secured to the bottom side of the material portion of the arm.

When film is in the frame and a slide is secured in position within the rear channel, the film remains unexposed, except for the light which is conducted via the material, through the clear portion of the acetate and to the film edge. This desired media will appear on the film when it is developed.

9 Claims, 2 Drawing Sheets

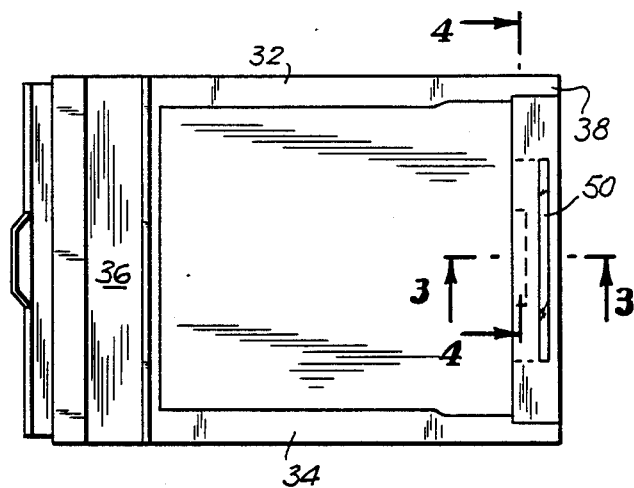
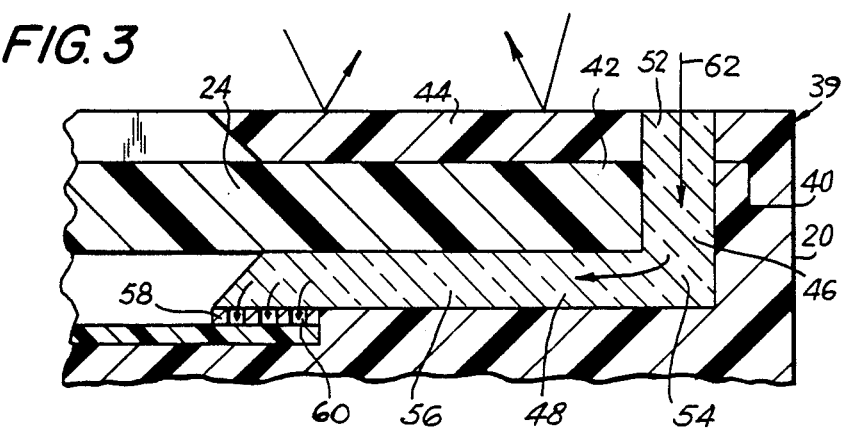
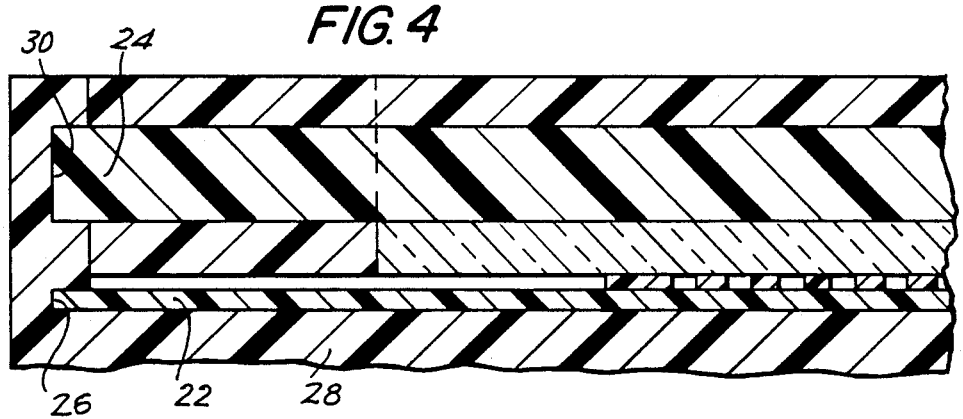

SHEET FILM HOLDER

BACKGROUND OF THE INVENTION

The invention relates to sheet film holders, and more particularly to a holder which will expose media as chosen by the photographer along the normally unused edge of the film.

Sheet film holders are well known in the photographic industry. They were particularly familiar to the average person who would see them used by newspaper photographers. Generally the camera would include a holder having two sheets of film in it with dark slides to prevent exposure of the film. The holder would be placed into the back of the camera, the slide would be removed, and then an exposure would be made through the camera. The slide would then be replaced, the holder turned over so that the other sheet of film could be exposed. When the two sheets had been exposed the holder would be removed and sent for developing.

A typical sheet film holder is number 1284 which was made by Graflex, Inc. of Rochester, N.Y.

Because the sheet of film is placed within a channel within the holder, there is a border of unexposed film along the outside edge. The border is usually approximately an eighth of an inch. Photographers have become very conscious of the need to protect their work from copying or to make certain that their work is properly attributed. Accordingly, it is desirable to either place some type of media on a photograph, such as a copyright notice, or a logo which is identified with the particular photographer. It is known to place media upon a film through a translucent plate 22 directing light to area 21 so the number may be inscribed along a portion of the film as seen in FIG. 2. This system is complicated and requires special equipment to expose a section of the film while protecting the rest of the film and has a unit which is separate from the holder but must be used in combination with the holder. The process is more involved than is necessary and the device operates by exposing a whole area except for where the marks are desired to be placed. This construction as disclosed in U.S. Pat. No. 1,323,364 is not a satisfactory solution to the issues previously raised.

Another approach to this problem has been to develop a separate unit such as the JUTA Signature Flash Box. This unit allows you to place sheet film in a particular unit and then briefly expose through light a strip along the margin so that the desired media may be permanently exposed into the film. Again, this solution raises the same problems as U.S. Pat. No. 1,323,364.

Accordingly, it is among the principal objects of the present invention to provide a sheet film holder with means to exposed desired media on the sheet film, all contained within the holder itself.

Another object of the present invention is to provide a sheet film holder of the character described which requires no separate steps apart from what has previously been necessary to place the sheet film within the holder.

Still yet a further object of the present invention is to provide a sheet film holder with means to expose desired media, the exposure taking place in that portion of the sheet film which is normally unexposed during picture taking and which at the time of development is normally unused.

Still yet another object of the present invention is to provide a holder of the construction described which eliminates the problem of light leakage on the normal film area.

Still a further object of the present invention is to provide an improved sheet film holder where there is no need to apply media for each exposure of sheet of film.

Still a further object of the present invention is to provide a unique and novel holder which does not require use of opaque material such as powder, which are difficult to handle, and which could result in changes in the media as each separate exposure occurs.

Still yet another object of the present invention is to provide an improved sheet film holder which will be simple and economical to manufacture, and yet be durable to high degree in use.

BRIEF DESCRIPTION OF THE INVENTION

The improved sheet film holder consists of a normal holder in which the outer portions of the rear wall have been replaced by a hinged member which includes the channel for receiving the dark slide. The member may be made of translucent light conducting material, a portion of which has been made opaque or standard opaque material with a portion removed and replaced by translucent light conducting material. The light conducting material starts at the outer service and forms the connecting arm of the channel as well as the bottom or inner arm of the channel. On the inner surface of the bottom arm a strip of acetate may be placed. The strip is opaque except for that portion in which media is located. The media may consist of a copyright notice, logo, or anything else desired by the photographer. Afer the strip is placed in position the hinged member is pivoted into its normal position. The film may be placed in position within a darkroom and the dark slide placed over the film, the distal edge of the slide being received within the channel of the hinged member. The holder may then be removed from the darkroom and placed in ordinary ambient light. The light passes through the translucent portion of the hinged member, passing through the connecting member and the lower arm with light passing through the clear part of the strip causing those clear areas to be exposed against the outer edge of the film. When the holder is used in a camera and the film in question is exposed through the camera, development will result not only in a normal picture but in the media appearing in the margin at the indicated location.

The above description, as well as further objects and advantages of the present invention will be more fully appreciated with reference to the following detailed description of a preferred, but none the less a illustrative embodiment of the invention, when taken in conjunction with the following drawings wherein:

FIG. 2 is a top plan view of the invention of FIG. 1;

FIG. 3 is an enlarged side elevational view of a portion of FIG. 2 taken along the lines of 3—3 of FIG. 2 and showing how ambient light is conducted through the translucent member and onto the film; and FIG. 4 is a cross-sectional view, partly cut away, taken along the lines 4—4 of FIG. 2.

DETAILED DESCRIPTION OF THE DRAWINGS

Figure 1:
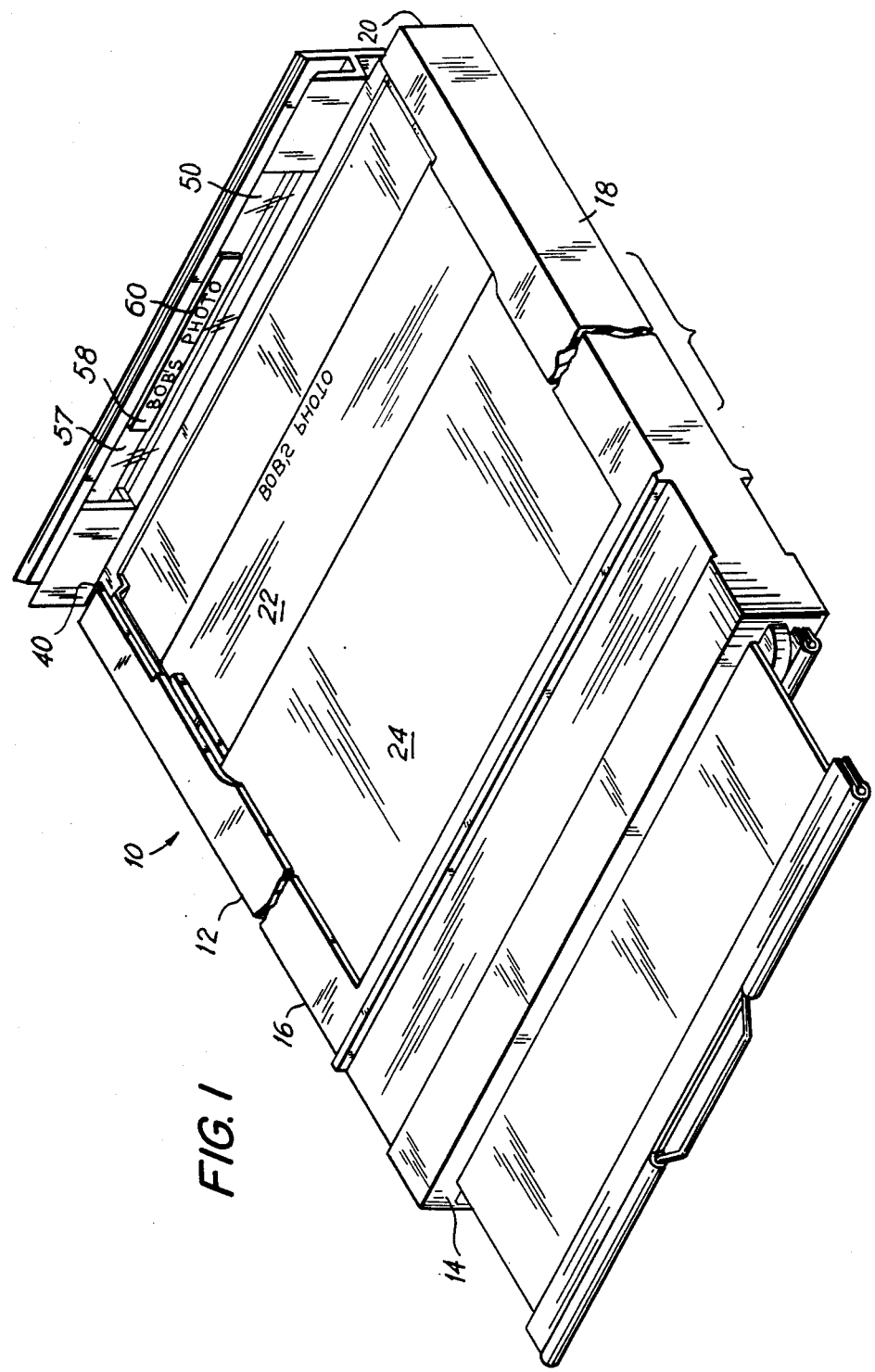
FIG. 1 is a front prespective view, partly cut away, with the dark slide partially removed from its normal covering position and with the hinged member pivoted upwardly, exposing the distal portion of the film and showing the positioning of the media after having been exposed.

Turning in detail to the drawings, and more particularly to FIG. 1, there is shown an improved sheet film holder 10 comprising a frame defined by a front wall 14, left and right side walls 16, 18 and a rear wall 20. A sheet of film 22 is received in the usual fashion and is covered by a dark slide 24 in the usual fashion.

Turning to FIG. 4, and concentrating only on one half of the dual sheet film holder, the film 22 is received within a standard film channel 26 and rests against the back plate 28 which separates the two sheets of film. Prior to exposure and after exposure the film is protected by the dark slide 24 which is received within the slide channel 30. The top of the holder is further defined by top left and right side walls 32, 34, top front wall 36 and top rear wall 38.

In FIG. 3 the hinged member 39 is secured to the rear wall 20 by means of an internal hinge 40 and includes a rear channel 42 defined by an outer arm 44 a connecting member 46 and an inner arm 48. The whole member or a portion of the member may have a light conducting portion 50. The light conducting portion includes a top wall portion 52 commencing at the outer surface or exposed to the ambient light, a connecting member portion 54 which includes the connecting member 46 and an inner arm portion 56 which includes the inner arm 48. The member 39 pivots to an upright position as shown in FIG. 1 to facilitate insertion and removal of the film 22, as well as placement of the strip 58.

Positioned against the bottom surface 57 of the inner arm is a strip 58 which can be made of acetate, commercially available as Kodalith, and may be opaque except for a clear portion to delineate the media 60. The strip 58 abuts the edge of the film which is not exposed and which forms the border of the negative. The light may pass from the atmosphere and is designated by light rays 62 passing through the portions 52, 54, 56, through the media 60 and on to the edge of the unexposed film. The continuing light passing through eventually will cause exposure where the light can pass through the non-opaque portions of the strip 58.

When the dark slide 24 is removed after the holder has been placed in the camera, the film is exposed in the normal usage by the photographer. After usage the dark slide is replaced, the holder is removed, and ultimately the sheet of film is developed. During the developing the media will appear along the edge in the normal fashion as any other exposed portion of the film. The remaining portion of the edge will appear white in the normal manner, since the edge had not been exposed to light when the picture was taken.

Once film holders have been adapted, the only additional step required for media to be placed upon sheet film is to prepare an acetate strip and place it in position along the bottom surface of the inner arm of the hinged member. After that is done, sheet film is placed in position and removed, with pictures being taken in the normal fashion.

Thus, there is provided a very simple mechanism for achieving a desired result, and eliminating much complex additional materials and added processing steps.

As can be seen, the present invention provides a significant advance over the state of the technology. As numerous additions, modifications and constructions can be performed within the scope of the invention, such scope is to be measured by the claims herein.

What is claimed is:

1. An improved sheet film holder to provide a desire media exposure for a sheet of film, comprising:
   (a) sheet film holder means having front, side and rear walls and holding at least one sheet of film with a dark slide to protect the film from exposure;
   (b) at least one of said walls having a first member with a channel receiving an edge of said dark slide;
   (c) said first member further including a light-conducting portion having an inner surface abutting the film; and
   (d) a strip having light-transmitting media thereon secured to said inner surface of the light-conducting portion, the sheet of film having an edge positioned directly underneath said inner surface;
   whereby the light passing through the light-transmitting media secured to the light-conducting portion exposes the edge of the film.

2. The invention according to claim 1 the first member having a hinge, the hinge being pivotally connected to the rear wall to allow rotational movement of the first member for facilitating insertion and removal of the film and the strip.

3. The invention according to claim 2, the light conducting portion including a connecting member and an inner arm formed with the inner surface, conducting ambient light into the interior of the holder, and through the non-opaque portions of the strip.

4. The invention according to claim 3, the holder including a back plate with sheets of film on each side thereof, and having a film retaining member on each side thereof.

5. The invention according to claim 1, the channel receiving the slide being defined by an outer arm and the light conducting portion.

6. The invention according to claim 1, the light conducting portion including a connecting member and an inner arm formed with the inner surface, conducting ambient light into the interior of the holder, and through the non-opaque portions of the strip.

7. The invention according to claim 6, the first member having a hinge, the hinge being pivotally connected to the rear wall to allow rotational movement of the member for facilitating insertion and removal of the film and the strip.

8. The invention according to claim 6, the channel receiving the slide being defined by an outer arm and the light conducting portion.

9. The invention according to claim 8, the holder including a back plate with the sheets of film on each side thereof, and having a film retaining member on each side thereof.

* * * * *